United States Patent
Cok et al.

(10) Patent No.: US 8,646,691 B2
(45) Date of Patent: Feb. 11, 2014

(54) APPARATUS AND METHOD FOR USING MACHINE-READABLE CODES

(75) Inventors: Ronald Steven Cok, Rochester, NY (US); Thomas Joseph Murray, Cohocton, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

(21) Appl. No.: 13/231,125

(22) Filed: Sep. 13, 2011

(65) Prior Publication Data

US 2013/0062402 A1    Mar. 14, 2013

(51) Int. Cl.
*G06K 7/10*    (2006.01)

(52) U.S. Cl.
USPC .................. 235/462.25; 235/435; 235/462.11; 235/462.24; 235/462.41

(58) Field of Classification Search
USPC .......... 235/435, 462.11, 462.24, 462.41, 454, 235/462.25
See application file for complete search history.

(56) References Cited

U.S. PATENT DOCUMENTS

| | | | |
|---|---|---|---|
| 6,726,104 B2 | 4/2004 | Schuessler et al. | |
| 7,273,175 B2 | 9/2007 | Zhao et al. | |
| 7,702,162 B2 | 4/2010 | Cheong et al. | |
| 7,835,037 B2 | 11/2010 | Koide | |
| 7,841,531 B2 | 11/2010 | Onogi | |
| 7,886,978 B2 | 2/2011 | Ofek et al. | |
| 2003/0217267 A1* | 11/2003 | Kindberg | 713/168 |
| 2005/0052695 A1* | 3/2005 | Fukunaga et al. | 358/1.15 |
| 2006/0022035 A1* | 2/2006 | Shinkai | 235/383 |
| 2006/0282500 A1* | 12/2006 | Kiuchi et al. | 709/203 |
| 2007/0138270 A1* | 6/2007 | Reblin | 235/383 |
| 2007/0145148 A1* | 6/2007 | Zhu et al. | 235/472.01 |
| 2007/0146469 A1* | 6/2007 | Takizawa et al. | 347/212 |
| 2007/0239848 A1* | 10/2007 | Avery | 709/217 |
| 2008/0173718 A1* | 7/2008 | Ibe | 235/462.01 |
| 2008/0235093 A1* | 9/2008 | Uland | 705/14 |
| 2009/0240816 A1* | 9/2009 | Philyaw et al. | 709/227 |
| 2010/0140343 A1* | 6/2010 | Nakamura et al. | 235/375 |
| 2011/0017826 A1* | 1/2011 | Mohan et al. | 235/462.11 |

\* cited by examiner

*Primary Examiner* — Daniel Hess
*Assistant Examiner* — Paultep Savusdiphol (57) ABSTRACT

A method of using a machine-readable code to extract information includes using an image-capture device to capture a digital image of a machine-readable code encoding information wherein the image-capture device is positioned at any of a plurality of angles relative to the machine-readable code; using a processor to extract the information encoded in the machine-readable code; using the processor to analyze the captured digital image of the machine-readable code and calculate the relative positioned angle at which the image-capture device was positioned when the image-capture device captured the digital image of the machine-readable code; and using the processor and the calculated relative positioned angle to determine information.

15 Claims, 9 Drawing Sheets

APPARATUS AND METHOD FOR USING MACHINE-READABLE CODES

FIELD OF THE INVENTION

The present invention relates to methods and apparatus for using machine-readable codes.

BACKGROUND OF THE INVENTION

Machine-readable optical codes have been in use for many years. The ubiquitous one-dimensional barcode has been used for product tracking and to automate purchases. For example, one-dimensional barcodes are in widespread use for managing point-of-sale purchase transactions using computer-controlled laser scanners.

More recently, two-dimensional codes, also known as matrix barcodes, such as QR ("Quick Response") codes, have become popular. Two-dimensional codes can encode a much greater quantity of information than one-dimensional codes. The information encoded in such codes is readily accessed through digital photographs of the codes that are processed by application software found in mobile communication devices such as cell phones having digital signal processing and internet communication access. QR codes are frequently employed in conjunction with product advertising to provide an internet URI website link with information about the product advertised.

Figure 5:
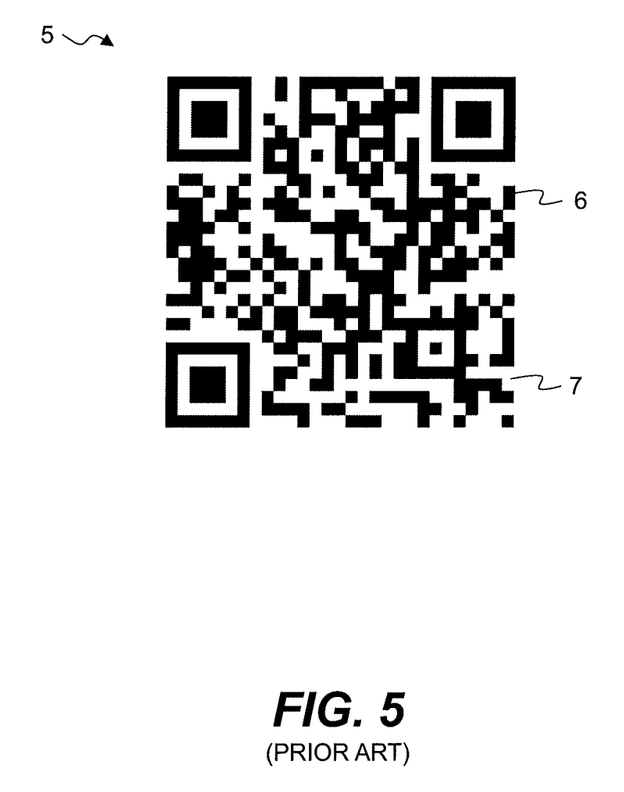
FIG. 5 is an illustration of a prior-art machine-readable code useful in understanding the present invention.

Optical bar codes are typically intended to be visually observable by humans, so that humans can find the codes and take appropriate action to access encoded information or otherwise use the codes. In contrast, steganographic information is designed to be hidden within an image. The present application addresses optical codes that are intended to be observable to humans and does not address steganographic codes. Referring to FIG. 5, a matrix barcode 5 of the prior art is illustrated with dark elements 6 and light elements 7 forming black modules on a white background. As used herein, the term matrix barcode is used synonymously with two-dimensional code. A QR code is an example of a matrix barcode.

The formation, scanning, and decoding of one- and two-dimensional bar codes is known in the art. For example, U.S. Pat. No. 7,273,175 describes a method, apparatus and a storage medium for locating QR codes. U.S. Pat. No. 7,702,162 describes a mixed code including a first code image region and a second code image region. An image processing apparatus including an optical reader and image processing hardware is discussed in U.S. Pat. No. 7,835,037. U.S. Pat. No. 7,841,531 discloses a camera operating system and matrix decoding device. U.S. Pat. No. 7,886,978 describes techniques for decoding images of barcodes. U.S. Pat. No. 6,726,104 discloses machine-readable optical symbols with areas of different spectral characteristics printed on different printers with different dot pitches.

Robust machine-readable code scanning equipment can retrieve information or references to information encoded in the machine-readable codes under a wide variety of environmental conditions. However, the information retrieved does not change under the circumstances of capture nor do the codes or code-reading applications provide any way for user input or interaction. This lack of flexibility can limit the uses and application of barcodes. There is a need, therefore, for an improved method and apparatus for reading machine-readable codes that can provide additional user-controlled information, improved flexibility, use, and application of machine-readable codes.

SUMMARY OF THE INVENTION

In accordance with the present invention, a method of using a machine-readable code to extract information comprises:

using an image-capture device to capture a digital image of a machine-readable code encoding information wherein the image-capture device is positioned at any of a plurality of angles relative to the machine-readable code;

using a processor to extract the information encoded in the machine-readable code;

using the processor to analyze the captured digital image of the machine-readable code and calculate the relative positioned angle at which the image-capture device was positioned when the image-capture device captured the digital image of the machine-readable code; and using the processor and the calculated relative positioned angle to determine information.

The present invention discloses an improved method and apparatus for reading machine-readable codes that provide additional user-controlled information, improved flexibility, use, and application of the code.

These, and other attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. For example, the summary descriptions above are not meant to describe individual separate embodiments whose elements are not interchangeable. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

The machine-readable codes illustrated in this application are representative and are not intended to encode any specific information.

DETAILED DESCRIPTION OF THE INVENTION

Figure 1:
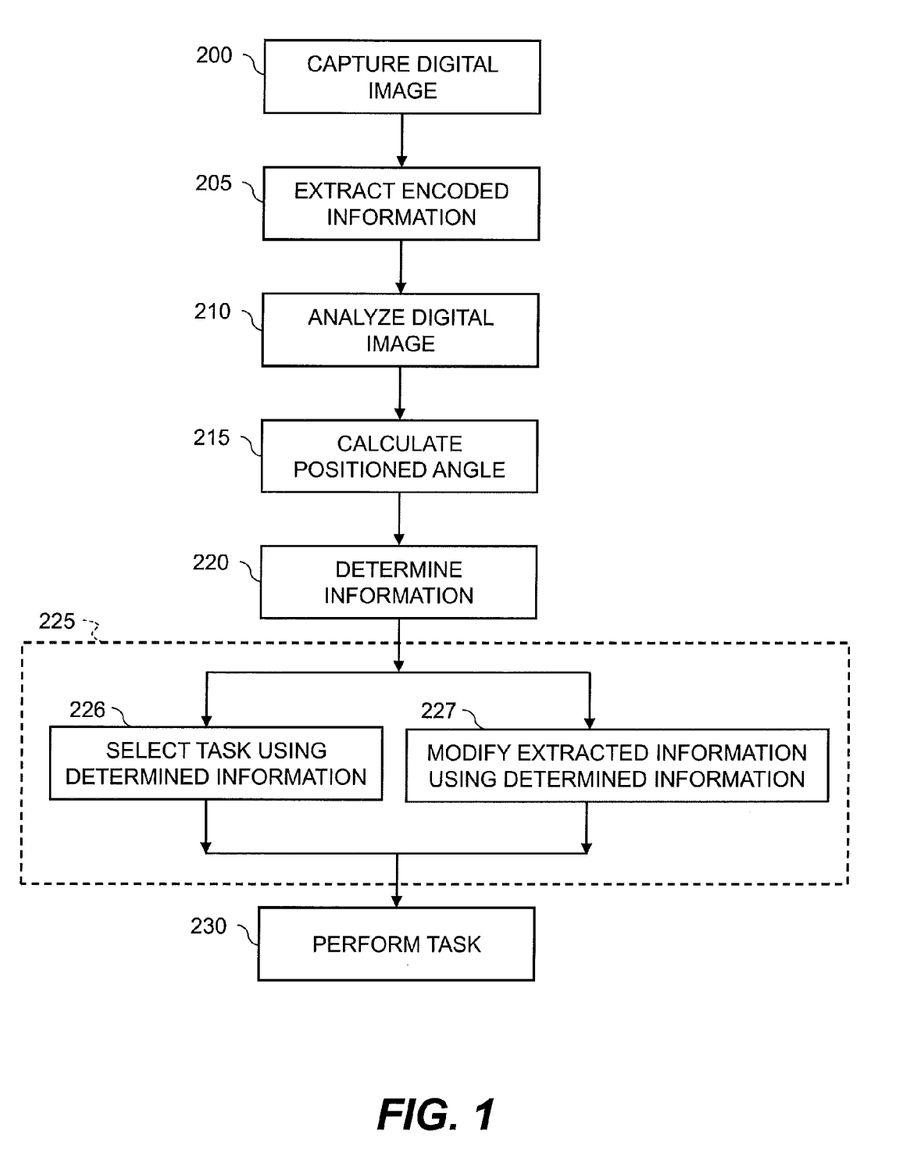
FIG. 1 is a flow-diagram illustrating a method according to an embodiment of the present invention.

Referring to FIG. 1, according to an embodiment of the present invention, a method of using a machine-readable code to extract information includes using an image-capture device to capture a digital image of a machine-readable code in step 200. The machine-readable code encodes information and is printed or formed on a largely planar substrate, for example a printed sheet of paper. The image-capture device is positioned at any of a plurality of angles relative to the machine-readable code. A typical electronic image-capture device captures a digital image by positioning a planar electronic sensor in an image plane by appropriately positioning the image-capture device and any associated optical elements and operating the image sensor. Thus, the image-capture device captures an image of machine-readable code at any of a plurality of different angles relative to the machine-readable code when the plane of the substrate on which the machine-readable code is formed is at a corresponding plurality of angles to the image plane and the image sensor is operated.

In such an arrangement of image-capture device and machine-readable code, the image-capture device is tilted with respect to the machine-readable code so that a first edge or side of the image sensor is closer to the machine-readable code than a second edge or side. The greater the relative angle between the image-capture device image sensor and the machine-readable code planar substrate, the closer the first edge or side will be to the machine-readable code than the second edge or side.

Once the digital image of the machine-readable code is captured, the digital image is processed to extract the information encoded in the machine-readable code in step 205. This information is referred to herein as extracted information. The extraction processing is done, for example by a programmable processor executing a software program. Programmable processors and software are known in the computing arts as are algorithms for locating a machine-readable code in a digital image and processing the portion of the digital image that includes the machine-readable code to extract and decode information encoded in the machine-readable code.

The captured digital image can also be analyzed in step 210 to calculate the relative positioned angle of the image-capture device with respect to the machine-readable code when the image-capture device captured the digital image of the machine-readable code (step 215). Most machine-readable codes have a standardized structure that includes straight lines. For example, one-dimensional barcodes use a series of lines all having the same height but variable thickness and spacing. Two-dimensional matrix barcodes 5 such as QR codes have a square structure with square rectangles at several corners (as shown in FIG. 5). Since the lines or edges of a square are known in actuality to be the same length, by comparing the relative length of comparable lines in the digital image the angle at which the image sensor was positioned with respect to the machine-readable code when the digital image was captured can be determined by employing the mathematical relationships of image perspective and parallax. This analysis is done using the same, or a different, processor or processors used to extract the information from the machine-readable code. Such analyses and algorithms are known in the mathematical arts, in particular by employing known trigonometric properties.

The calculated positioned relative angle is used to determine information in step 220. According to embodiments of the present invention, the relative angle at which the image-capture device is positioned relative to the machine-readable code when the digital image is captured carries information, referred to herein as determined information. The meaning or use of the determined information is dependent on the use or context of the machine-readable code and is provided for example by a software application. Thus, the calculated positioned relative angle provides determined information that is relevant to, or dependent upon, an application of the machine-readable code—the determined information provides additional information or instructions that are context dependent.

In one embodiment, the determined information is additional information related to the extracted information, in addition to the extracted information, or that modifies the extracted information in some way. In another embodiment, the determined information relates to information found in either the machine-readable code or an external source, is used to access further information or to process information, or is used to access information stored in an external source.

In a further embodiment of the present invention, the extracting step (205) includes extracting a universal resource indicator (URI) and the determining step (220) determines an argument to the URI. For example, a machine-readable code can encode an internet web address such as a universal resource locator or URL. The information located at the URL address is available in two (or more) different languages. The determined information can specify the language. A software application in the image-capture device can retrieve the information stored at the internet address specified by the extracted information in the language specified by the determined information and display the information in the desired language to a user on a display in the image-capture device. Hence, a user can capture a digital image (step 200) of the machine-readable code at a first angle to receive information in a corresponding first language or capture a digital image of the machine-readable code at a second different angle to receive information in a corresponding second different language.

In a different embodiment, the extracted or determined information refer to actions. For example, the determining step (220) determines an action and the extracting step (205) determines information relevant to the action. Alternatively, the extracting step (205) determines an action and the determining step (220) determines information relevant to the action. For example, a machine-readable code can encode an internet web address. By capturing a digital image of the machine-readable code at a first relative angle, information stored at the encoded internet web address can be displayed to a user. By capturing a digital image of the machine-readable code at a second different relative angle, the encoded internet web address can be stored in a database for later review. In this example, the determined information specifies the action to be taken with respect to the extracted information.

Referring again to FIG. 1, in a further embodiment of the present invention, the determined information is used in step 225 and a task performed in step 230. The determined information is used (step 225) in at least one of at least two ways as described above. In one way, a task is selected using the determined information (step 226) and performed (step 230). In another way, the determined information modifies the extracted information (step 227) and a task performed (step 230). A modification to the extracted information can include changing, removing, or adding information. In another embodiment, the determined information both provides additional information and task-related specification.

Figure 2:
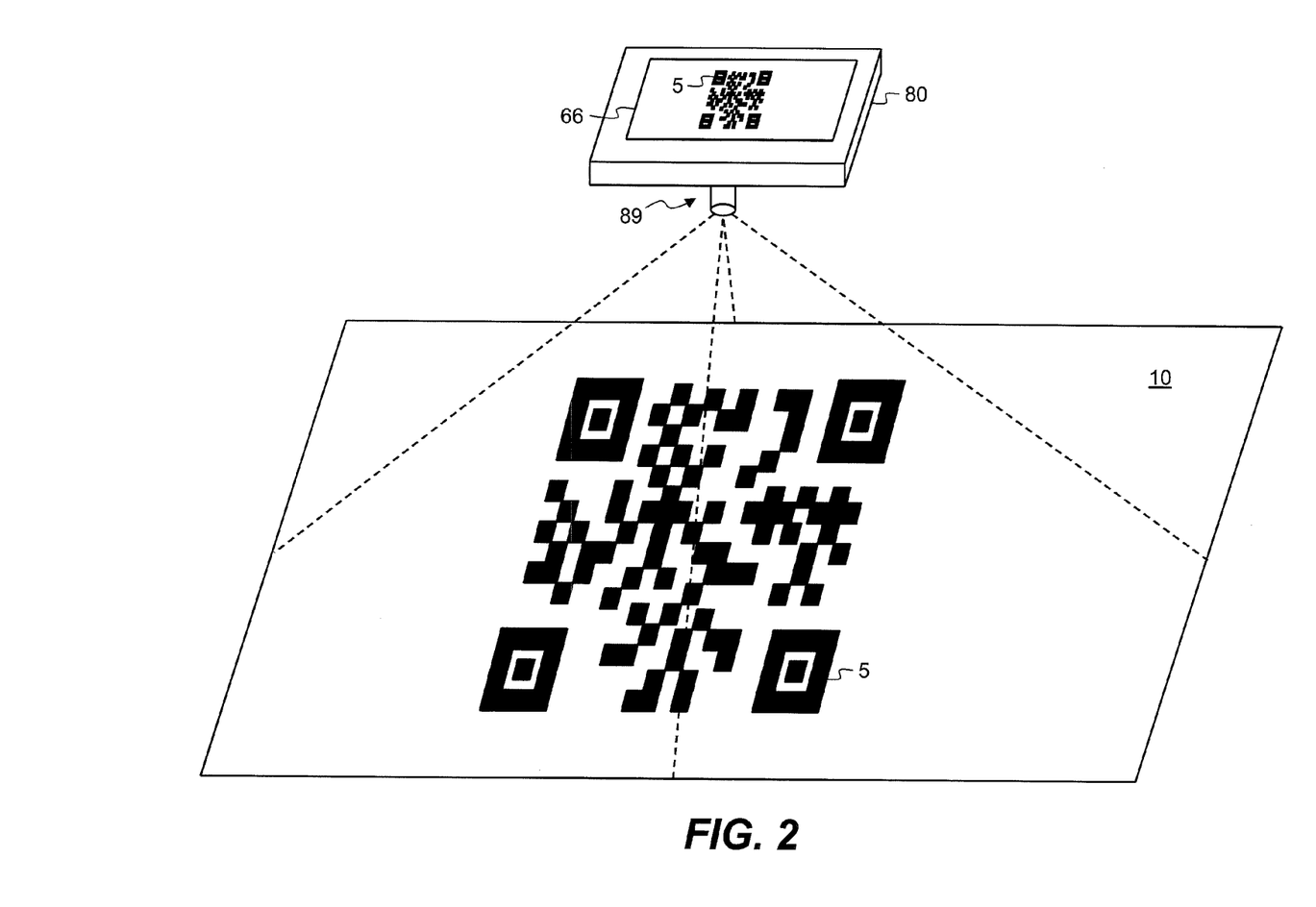
FIG. 2 is a schematic illustrating an embodiment of the present invention.
Figure 3A:
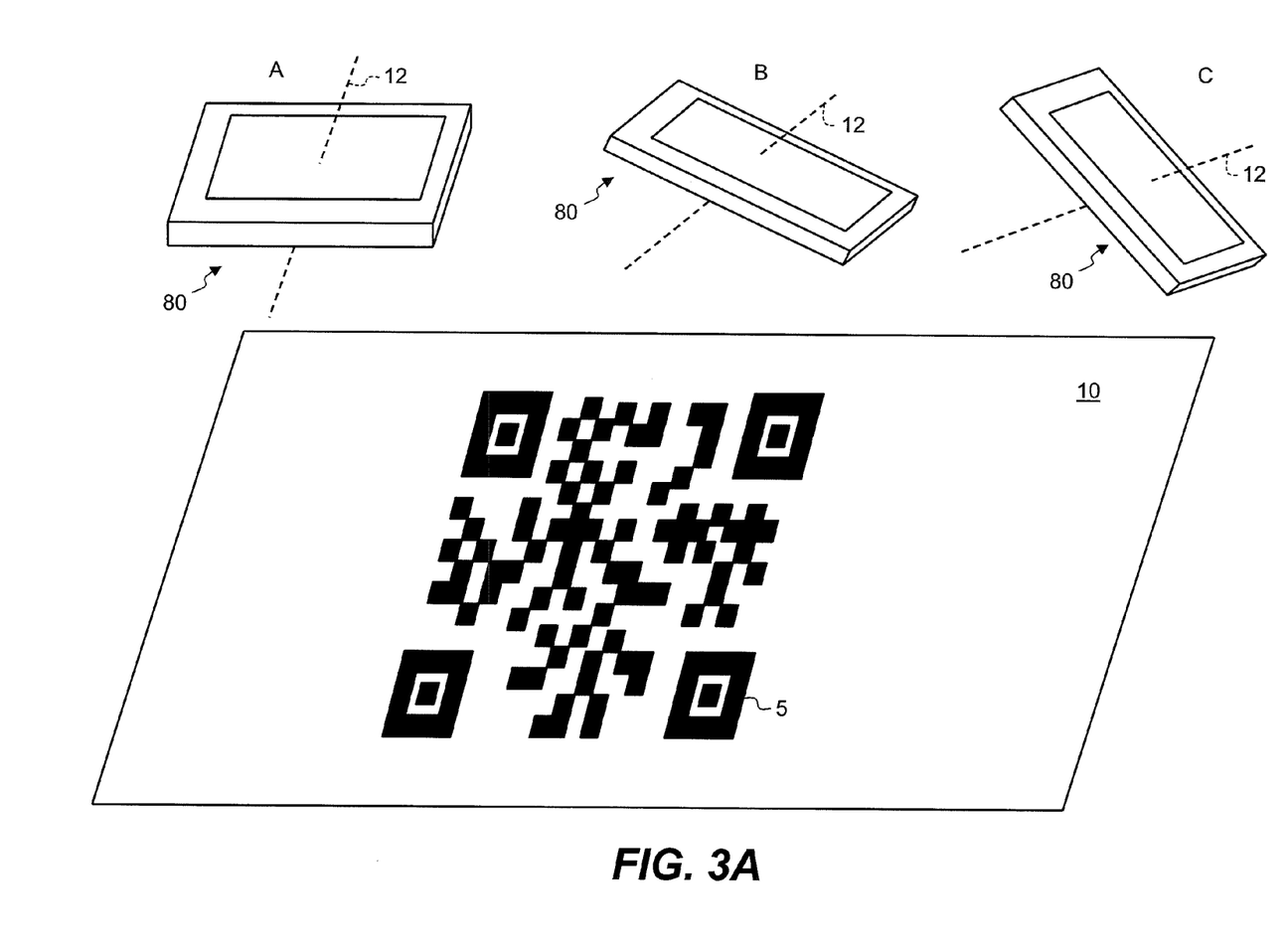
FIGS. 3A and 3B are schematics illustrating different relative positioned angles according to an embodiment of the present invention.
Figure 3B:
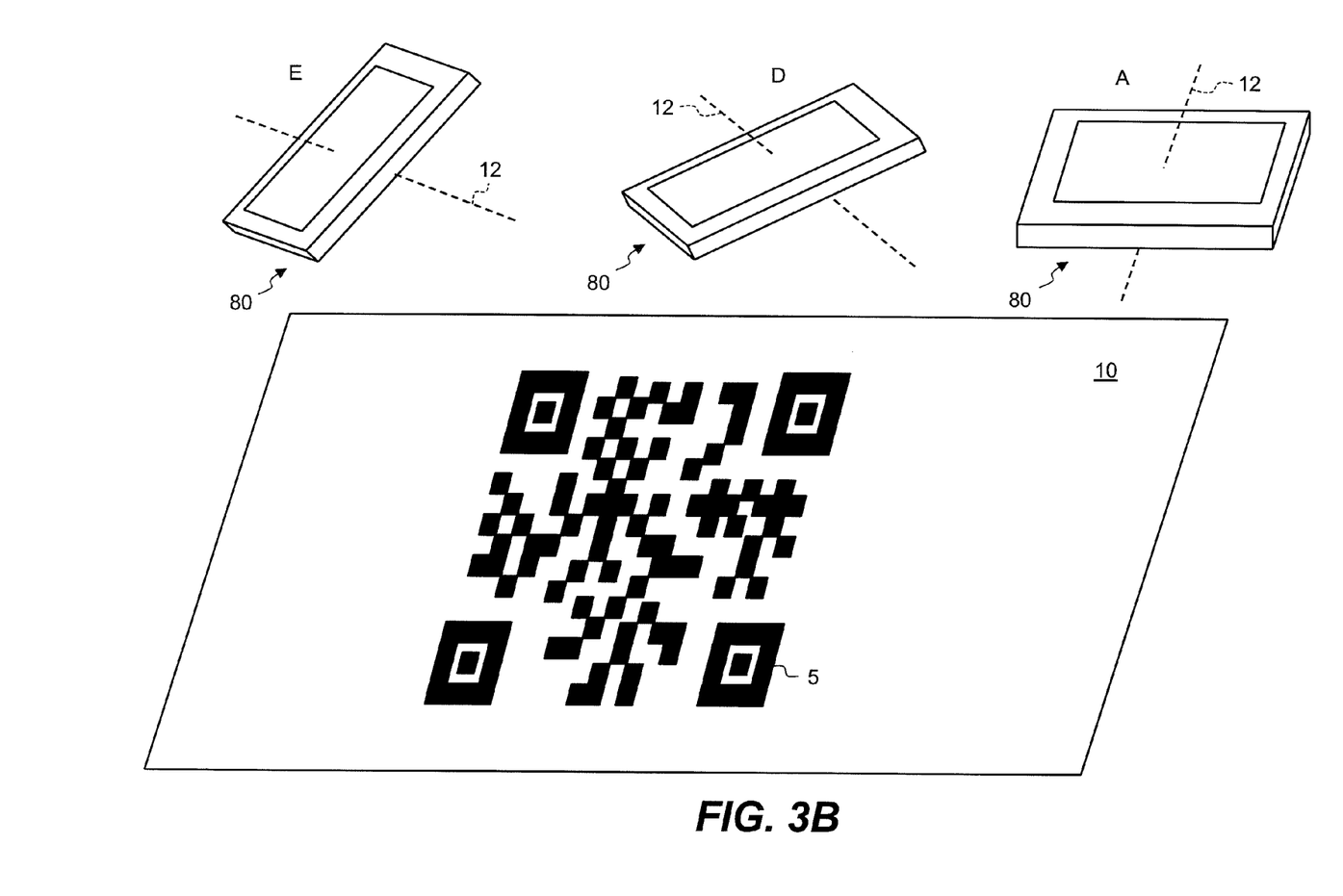

According to different embodiments of the present invention, the positioned angles include a normal angle in which the image sensor plane of the image-capture device is parallel to the substrate plane on which the machine-readable code is formed and the optical axis of the image-capture device is perpendicular to the substrate plane on which the machine-readable code is formed. This arrangement is illustrated in the perspective of FIG. 2 in which a substrate 10 having a QR code 5 formed thereon is photographed by a digital camera 89 incorporated in a mobile communication system 80 to form a digital image of the QR code 5 on a local display 66. Referring to FIG. 3A, illustration A shows a relative normal positioned angle (axis 12) of a mobile communication system 80 with respect to a substrate 10 having a QR code 5 formed thereon (corresponding to FIG. 2), illustration B shows a first right angle and illustration C shows a second right angle larger than the first right angle in which the image-capture device is tilted by a user facing the machine-readable code so that the right side of the image-capture device is closer to the machine-readable code than the left side of the image-capture device. Referring to FIG. 3B, illustration A shows a relative normal positioned angle (axis 12) of a mobile communication system 80 with respect to a substrate 10 having a QR code 5 formed thereon (corresponding to FIG. 2, and A in FIG. 3A), illustration D shows a first left angle and illustration E shows a second left angle larger than the first left angle in which the image-capture device is tilted by a user facing the machine-readable code so that the left side of the image-capture device is closer to the machine-readable code than the right side of the image-capture device. Likewise, above angles correspond to captured digital images when the top of the camera (as normally held by a user) is closer to the machine-readable code than the bottom of the camera. Similarly, below angles correspond to captured digital images when the bottom of the camera (as normally held by a user) is closer to the machine-readable code than the top of the camera. In another embodiment, a combination of left and above angles, a combination of left and below angles, a combination of right and above angles, or a combination of right and below angles is employed. The degree and kind of angles can be used to provide additional determined information.

Figure 4:
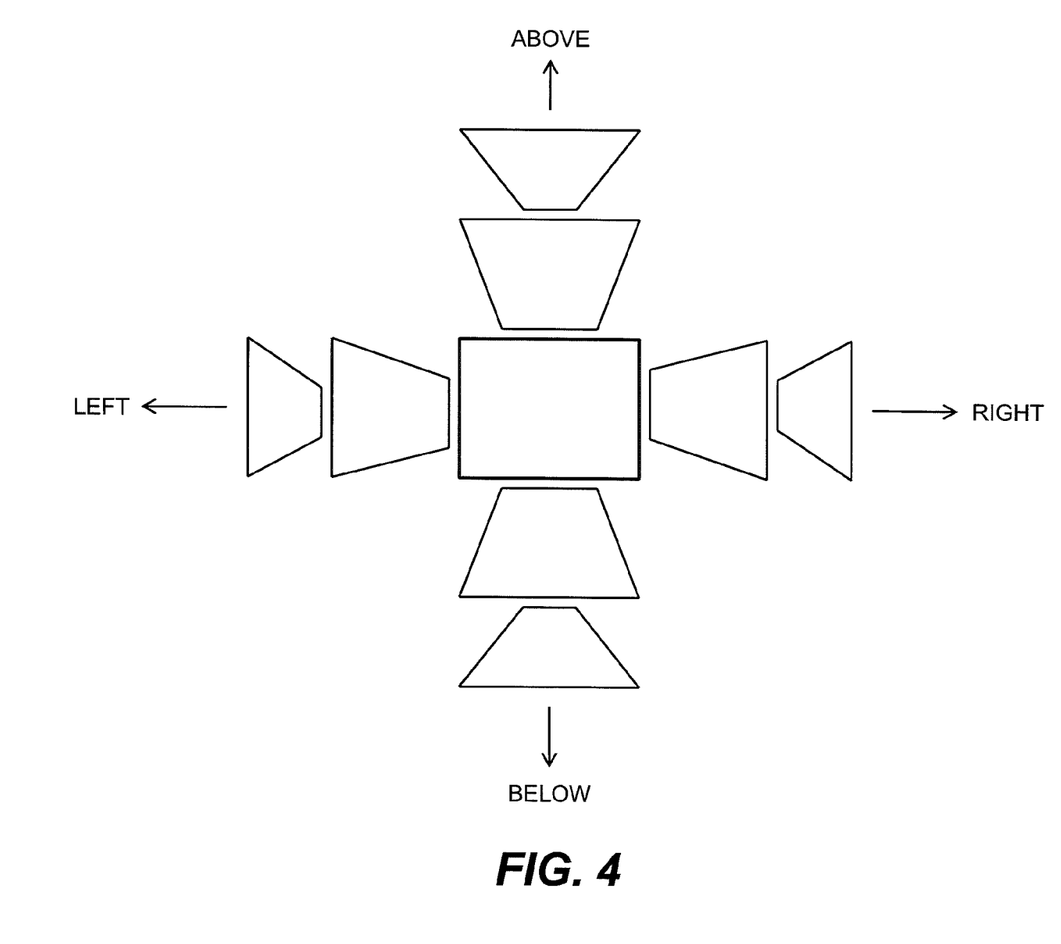
FIG. 4 is an illustration of perspective useful in understanding the present invention.

FIG. 4 illustrates (in an exaggerated form), the digital images corresponding to images captured by the image-capture device image sensor at different relative angles to the substrate on which the machine-readable code is formed. The machine-readable code is illustrated as a simple rectangle. At the center, a normal rectangle is shown corresponding to an image acquired when the image sensor is parallel to the substrate. In a real system, some curvature of the lines can be expected due to camera optics. This effect is well understood in the optical sciences, can be minor, is readily compensated and is ignored herein. To the right of the center, two trapezoids are shown illustrating the digital images resulting from a first relative right angle position and a second, larger relative right angle. As illustrated, the right side of the trapezoid is larger than the left side and the difference is used to determine the relative right angle. To the left of the center, two trapezoids are shown illustrating the digital images resulting from a first relative left angle position and a second, larger relative left angle. As illustrated, the left side of the trapezoid is larger than the right side and the difference is used to determine the relative left angle. Above the center, two trapezoids are shown illustrating the digital images resulting from a first relative above angle position and second, larger relative above angle. As illustrated, the top side of the trapezoid is larger than the bottom side and the difference is used to determine the relative above angle. Below the center, two trapezoids are shown illustrating the digital images resulting from a first relative below angle position and second, larger relative below angle. As illustrated, the bottom side of the trapezoid is larger than the top side and the difference is used to determine the relative below angle.

In any digital image capture, it is possible to translate the image-capture device with respect to the machine-readable code, regardless of the relative positioned angles of the image sensor and the machine-readable code. Thus, the machine-readable code need not be in the center of the digital image or, indeed, at any specific location in the digital image. Available image processing software can locate and extract the machine-readable code in various positions in the digital image.

In various embodiments of the present invention, the machine-readable code is a one-dimensional barcode, a two-dimensional matrix barcode, or a QR code.

Figure 6:
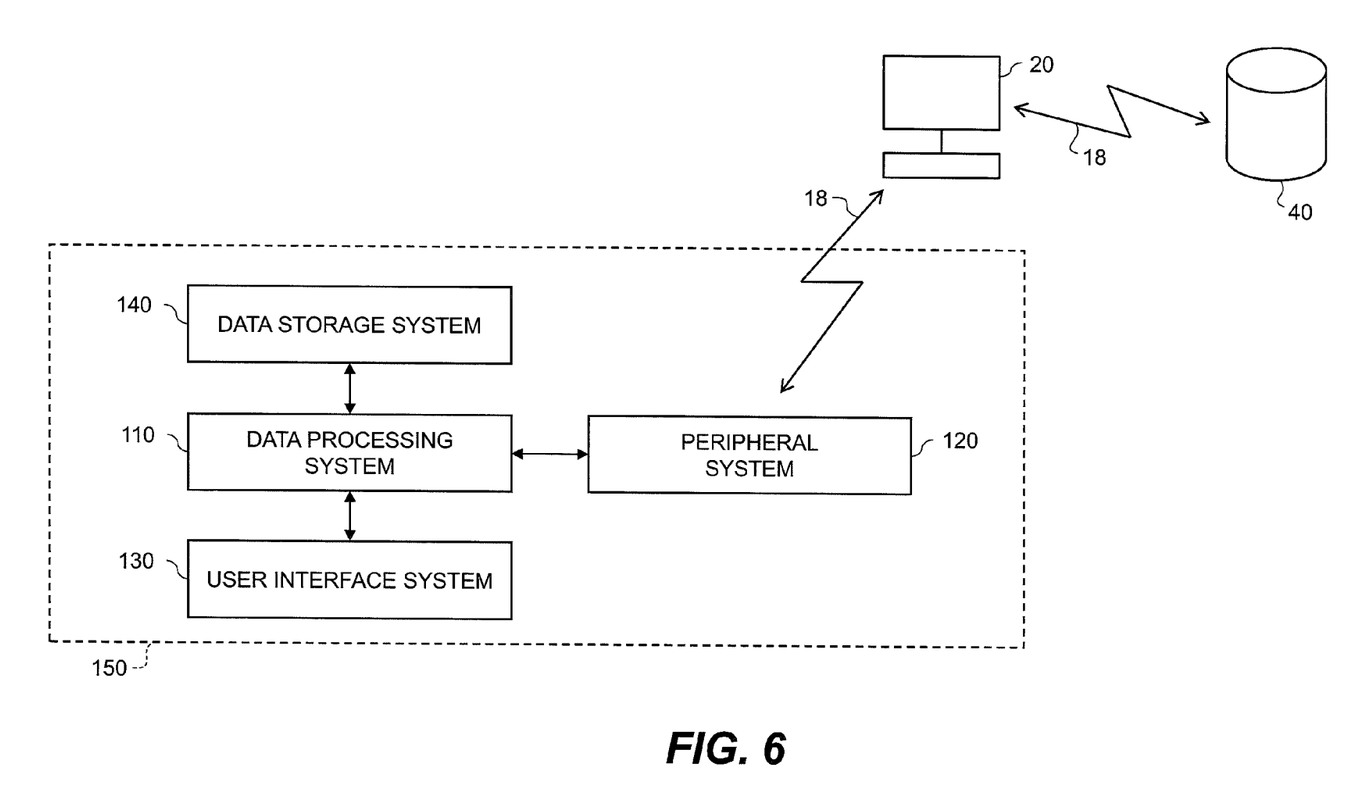
FIG. 6 is a schematic of a processing and communication system embodiment of the present invention.
Figure 7:
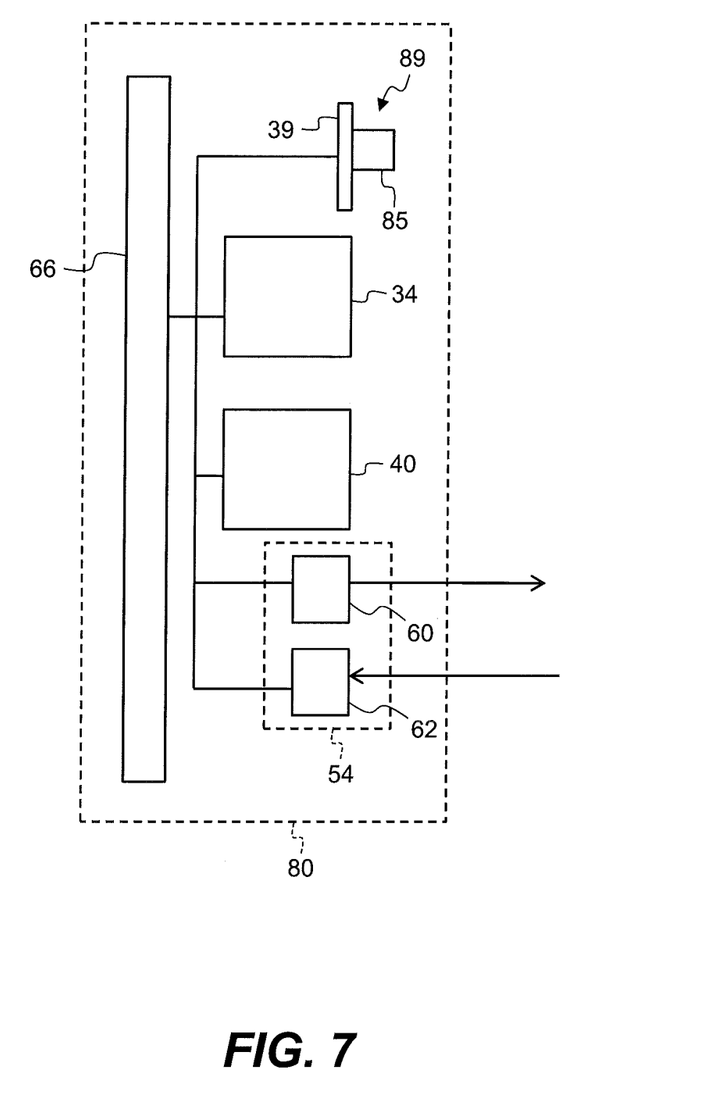
FIG. 7 is a schematic of a mobile communication device according to an embodiment of the present invention.
Figure 8:
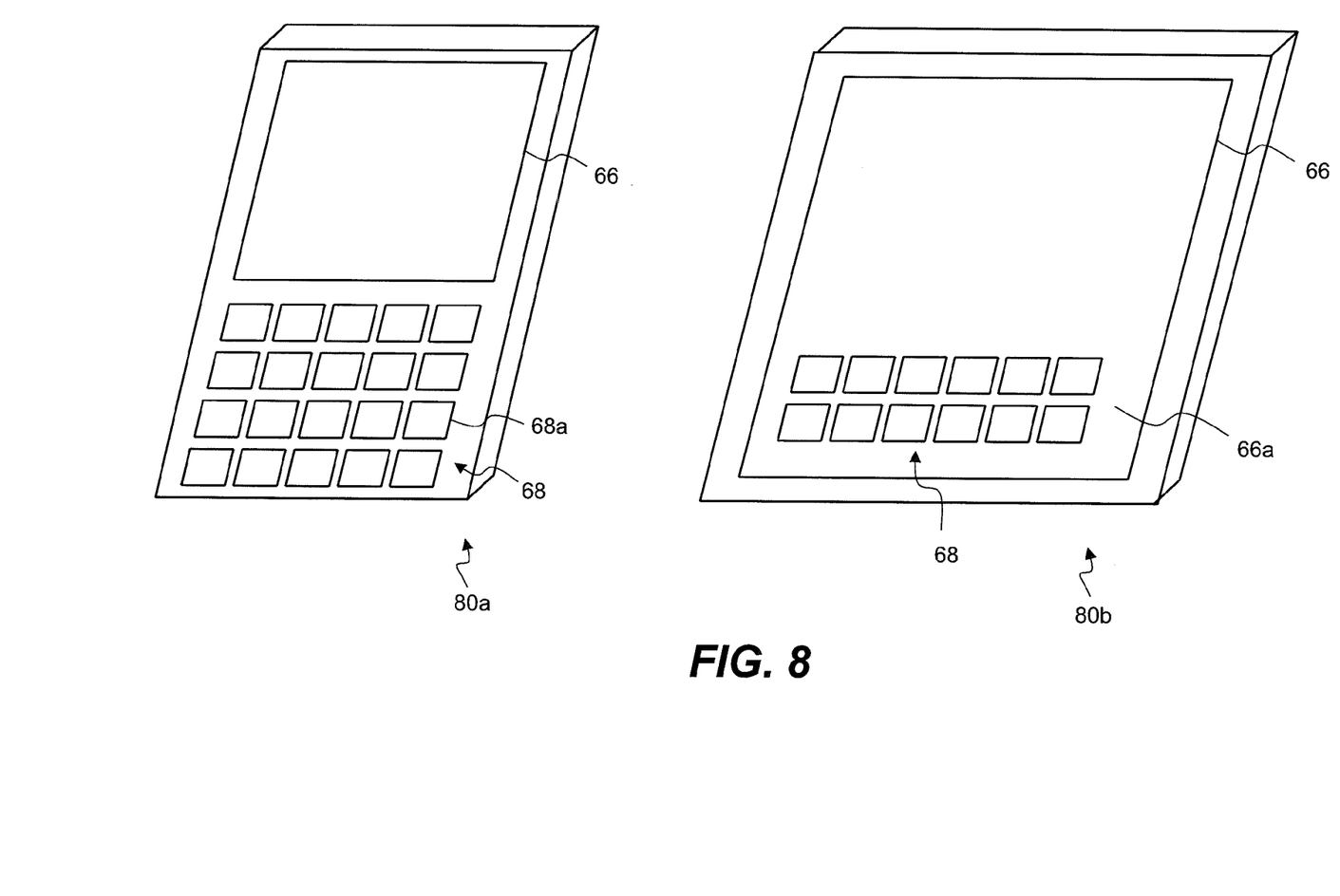
FIG. 8 is a perspective of a mobile communication device according to an embodiment of the present invention.

According to an embodiment of the present invention and as illustrated in FIGS. 6, 7, and 8, an apparatus for a machine-readable code to extract information includes a mobile imaging device including an image capture device and a processor. The image-capture device includes ways to capture a digital image of a machine-readable code encoding information at any of a plurality of angles. Such an image-capture arrangement can include a digital camera. Digital cameras having a variety of sensor, control, and optical mechanisms are well known in the optical and digital computing arts. The processor includes ways to extract the encoded information from the captured digital image. Such ways can include digital processors found in computers or mobile telephones that execute software programs to accomplish a task. Processors can include single or multiple processors, single or multiple integrated circuits, and can include processors that are spatially distributed over a computer network. The processor also includes ways to analyze the captured digital image to calculate the angle at which the machine-readable code was positioned with respect to the image capture device when the image capture device captured the digital image of the machine-readable code.

In various embodiment, the processor includes ways to perform a task specified by the extracted information and to use the determined information in the task, ways to perform a task specified by the determined information and using the extracted information in the task, ways to perform a task selected from a group of tasks by using the determined information, or ways to access external information using the extracted information and the determined information.

In various embodiments of the present invention, the positioned angles include a normal angle, one or more left angles, one or more right angles, one or more above angles, one or more below angles, or a combination of left and above angles, a combination of left and below angles, a combination of right and above angles, or a combination of right and below angles.

FIG. 6 is a high-level diagram showing the components of a system useful for practicing various embodiments of the present invention. The system includes a data processing system 150, a peripheral system 120, a user interface system 130, and a data storage system 140. The peripheral system 120, the user interface system 130 and the data storage system 140 are communicatively connected to the data processing system 150.

The data processing system 150 includes one or more data processing devices, for example digital information processors, that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise. The data processing system 150 can include a single processor, multiple processors, or distributed multiple processors, for example distributed over a computer network.

The data storage system 140 includes one or more processor-accessible memories configured to store information, including the information needed to execute the processes of the various embodiments of the present invention, including the example processes described herein. In one embodiment, the data storage system 140 is a distributed processor-accessible memory system including multiple processor-accessible memories communicatively connected to the data processing system 150 via a plurality of computers or devices. In another embodiment, the data storage system 140 is not a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors. In this regard, although the data storage system 140 is shown separately from the data processing system 150, one skilled in the art will appreciate that the data storage system 140 can be stored completely or partially within the data processing system 150. Further in this regard, although the peripheral system 120 and the user interface system 130 are shown separately from the data processing system 150, one skilled in the art will appreciate that one or both of such systems can be stored completely or partially within the data processing system 110.

The peripheral system 120 can include one or more devices configured to provide digital content records to the data processing system 150. For example, the peripheral system 120 can include digital still cameras, digital video cameras, cellular phones, smart phones, or other data processors. The data processing system 150, upon receipt of digital content records from a device in the peripheral system 120, can store such digital content records in the data storage system 140.

The user interface system 130 can include a mouse, a keyboard, a touch screen, another computer, or any device or combination of devices from which data is input to the data processing system 150. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 150. In this regard, if the user interface system 130 includes a processor-accessible memory, such memory can be part of the data storage system 140 even though the user interface system 130 and the data storage system 140 are shown separately in FIG. 6. In one embodiment of the present invention, the system of FIG. 6 is a cellular telephone or digital camera with data processing system (150) for recording images from the incorporated image sensor 39 (FIG. 7), encoding or decoding the multi-resolution codes described herein, and presenting information on the user interface 130.

The data processing system 150 is communicatively connected through a communication network 18. Such a network can be a computer network, a voice communication network, a data network, or any other network for transferring information either to the data processing system 150 or from the data processing system 150, or both. Such a network can be a wired network, e.g. an Ethernet network, or a wireless network, e.g. a point-to-point network (e.g. a Bluetooth network), a local area wireless network (e.g. a WiFi network), or a cellular communication network. The communication network 18 can be the internet. The communication network 18 can be connected to remote electronic computer systems 20 (e.g. computer servers) and storage devices 40 (e.g. disk drives or solid state memories) for retrieving, storing, or processing information, or enabling communications.

Referring in more detail to the mobile communication system 80, as shown in FIG. 7, a mobile communication system 80 useful in various embodiments of the present invention can include a display 66 connected to a processor 34, storage device 40, communication system 54 including a transmitter 60 and a receiver 62, and an image sensor 39 with an optical lens system 85 forming a digital camera 89. The processor 34 can execute software stored in the storage device 40 to acquire digital images with the digital camera 89, display the digital images on the display 66, store the digital images in the storage device 40, or transmit the digital images. A digital image can be a scene or an image of a printed or displayed thumbnail image or of a matrix bar code 5. Such image capture, display, and storage software are known. In one embodiment, the mobile communication system 80 can include software stored in the memory storage 40 executed by the processor 34 to extract encoded references from photographs of matrix bar codes 5. Software for forming matrix bar codes 5 and for extracting references from matrix bar codes 5 is known. In another embodiment, the mobile communication system 80 does not include such software. Image processing services are provided, for example by remote computers connected to the mobile communication system 80 through the internet.

FIG. 8 is a perspective of a mobile communication system 80a that includes a display 66 together with a local input mechanism 68 such as a local keyboard or keypad 68a. Mobile communication system 80b includes a display 66a that incorporates a touch-screen providing local input 68. Both mobile communication system 80a that include keypads 68a or mobile communication system 80b that include displays with touch-screens 66a are known in the art. As shown in FIG. 6, a mobile communication device 80 (FIG. 7) can communicate through a network 18, either through wireless or wired networks, or through a point-to-point communication device, with a remote display to display images, for example, on a larger display than is present on the mobile communication device itself.

In an embodiment of the present invention, the mobile communication device 80 (FIG. 8) is for example a cellular telephone, a smart phone, or a wirelessly connected handheld computer such as a tablet computer. The mobile communication device 80 (FIG. 8) can communicate with remote electronic computer system 20 (FIG. 6) directly, for example through a wireless local area network or a point-to-point wireless connection, through a wired network, or indirectly through a cellular telephony network, or through the internet. The remote electronic computer system 20 can be a computer server, for example providing browser-based web pages to a remote electronic computer system, for example a mobile communication device 80. In particular, the mobile communication device 80 can incorporate a digital camera 89 (FIG. 7) with image sensor 39 to enable image capture. The electronic computer system 20 (FIG. 6) is useful for receiving information, encoding information, and outputting (e.g. by printing) the information in conjunction with other printed material such as images or graphic information.

Any one of the electronic computer system 20 or the mobile communication device 80 can execute software programs on the internal processor 34. The software programs can interact with a user through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the present invention.

The present invention provides an apparatus and way of enabling users to provide input to an application for use of a machine-readable code and to do so without requiring interaction with a conventional user interface. The input can provide additional information or specify an action to a computer system such as a network-connected image-capture system, for example smart cellular telephone providing data services through an internet connection. Such a capability provides additional user-controlled information, improved flexibility, use, and application of machine-readable codes.

The invention has been described in detail with particular reference to certain embodiments thereof, but it will be understood that variations and modifications can be effected within the spirit and scope of the invention.

PARTS LIST 5 two-dimensional code, QR code, matrix bar code
6 dark elements
7 light elements
10 substrate
12 axis
18 communication network
20 remote electronic computer system
34 processor
39 image sensor
40 storage device
54 communication system
60 transmitter
62 receiver
66 local display
66a touch-screen display
68 local input
68a keyboard or keypad
80, 80a, 80b mobile communication system
85 optical lens system
89 digital camera
110 data processing system
120 peripheral system
130 user interface system
140 data storage system
150 data processing system
200 capture digital image step
205 extract encoded information step
210 analyze digital image step
215 calculate positioned angle step
220 determine information step
225 use determined information step
226 select task using determined information
227 modify extracted information using determined information step
230 perform task step

The invention claimed is:

1. A method of using a machine-readable code to extract information, comprising:
   capturing, by an image-capture device, a digital image of a machine-readable code that encodes information, wherein the image-capture device is positioned at any of a plurality of angles relative to the machine-readable code;
   extracting, by a processor, the information from the machine-readable code, wherein the extracted information includes a web page address;
   analyzing, by the processor, the captured digital image of the machine-readable code to calculate an angle at which the image-capture device was positioned with respect to the machine-readable code when the image-capture device captured the digital image of the machine-readable code;
   determining, by the processor, information related to the extracted information, wherein the determined information is specific to the calculated angle, and wherein the determined information includes an argument to a web page associated with the web page address; and
   modifying, by the processor, the extracted information using the determined information, wherein the modification and the determined information are based upon the calculated angle.

2. The method according to claim 1, wherein the determined information provides additional information related to the extracted information.

3. The method according to claim 1, wherein the determined information relates to information found in an external source.

4. The method according to claim 1, wherein the determined information provides access to further information.

5. The method according to claim 1, wherein the extracted information provides access to information stored in an external source.

6. The method according to claim 1, wherein the determined information comprises an action and the extracted information comprises information relevant to the action.

7. The method according to claim 1, wherein the extracted information comprises an action and the determined information comprises information relevant to the action.

8. The method according to claim 1, wherein the extracted information or the determined information specifies a task, and further comprising performing the task.

9. The method according to claim 1, wherein the angle includes one or more of a normal angle, a left angle, a right angle, an above angle, and a below angle.

10. An apparatus for a machine-readable code to extract information, comprising:

an image capture device configured to capture, at any of a plurality of angles, a digital image of a machine-readable code that encodes information; and a processor operatively coupled to the image capture device, wherein the processor is configured to:

extract the encoded information from the captured digital image, wherein the extracted information includes a web page address;

analyze the captured digital image to calculate an angle at which the machine-readable code was positioned relative to the image-capture device when the image-capture device captured the digital image of the machine-readable code;

determine information related to the extracted information, wherein the determined information is specific to the calculated angle, and wherein the determined information includes an argument to a web page associated with the web page address; and modify the extracted information using the determined information, wherein the modification and the determined information are based upon the calculated angle.

11. The apparatus according to claim 10, wherein the processor is configured to perform a task specified by the extracted information and to use the determined information to perform the task.

12. The apparatus according to claim 10, wherein the processor is configured to perform a task specified by the determined information and to use the extracted information to perform the task.

13. The apparatus according to claim 10, wherein the processor is configured to perform a task selected from a group of tasks, and wherein the task is performed based at least in part on the determined information.

14. The apparatus according to claim 10, wherein the processor is configured to access external information using the extracted information and the determined information.

15. The apparatus according to claim 10, wherein the angle includes one or more of a normal angle, a left angle, a right angle, an above angle, and a below angle.

* * * * *